Figure 1:
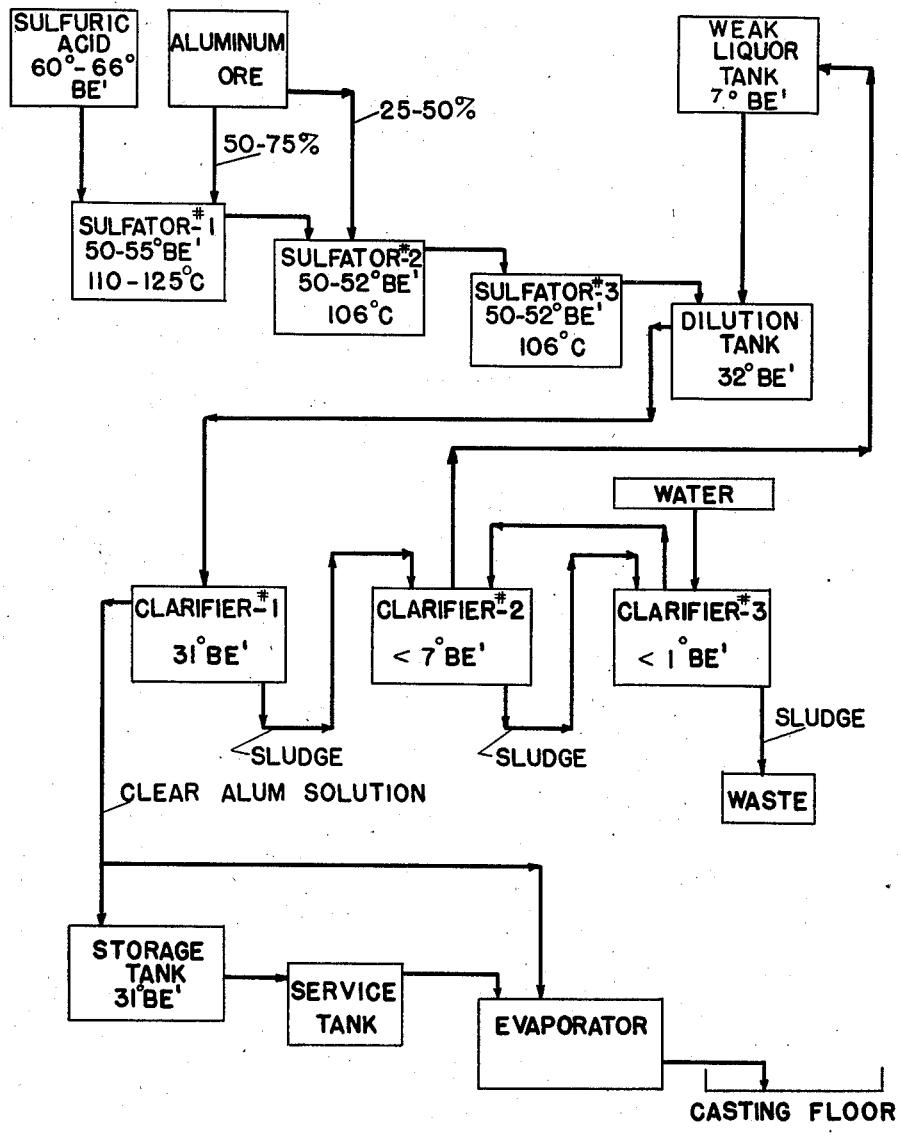

Feb. 24, 1942.  R. L. BROWN  2,273,930
PROCESS OF SULPHATING ALUMINUM ORE
Filed Nov. 2, 1939  2 Sheets-Sheet 1

ROBERT L. BROWN
*INVENTOR.*

BY  *Cleveland B. Hallabaugh*
*ATTORNEY.*

Feb. 24, 1942.         R. L. BROWN              2,273,930
              PROCESS OF SULPHATING ALUMINUM ORE
                    Filed Nov. 2, 1939        2 Sheets-Sheet 2

ROBERT L. BROWN
*INVENTOR.*

BY

*ATTORNEY.*

Patented Feb. 24, 1942

2,273,930

UNITED STATES PATENT OFFICE 2,273,930

PROCESS OF SULPHATING ALUMINUM ORE

Robert L. Brown, Atlanta, Ga., assignor to Hercules Powder Company, Wilmington, Del., a corporation of Delaware Application November 2, 1939, Serial No. 302,507

7 Claims. (Cl. 23—123)

This invention relates to the production of aluminum sulphate, and more particularly to an improved process of a sulphating alumina ore.

Heretofore, aluminum sulphate, hereinafter referred to as "alum," has been made by continuously flowing sulphuric acid and aluminum ore, such as bauxite, at predetermined rates into a sulphator, while maintaining the temperature in the sulphator at about 105° C. The overflow of the sulphator was received by a second sulphator adapted to complete the reaction between the acid and bauxite and to take care of short circuited materials. The overflow of the second sulphator flowed into a dilution tank and the diluted liquor was passed through a series of clarifiers which separated the clear alum solution from insolubles and sludge. The clear solution was then evaporated sufficiently to provide solidified alum upon cooling.

In practicing this method it was found that only about 83% of the alumina was sulphated and, because of sludge losses only, about 80% of the alumina was recovered.

An object of the present invention is to provide an improved process of sulphating aluminum ore, which is simple, economical and increases the percentage of alumina recovered.

Another object is to provide a process of sulphating aluminum ore which increases the percentage of alumina sulphated.

Another object is to provide a more rapid method of sulphating aluminum ore and to increase the capacity of production.

Another object is to provide a method of sulphating aluminum ore, wherein the sludge settles more rapidly and a smaller more compact volume of sludge is handled by the clarifiers.

A further object is to reduce losses of alumina in the sludge.

A still further object is to enable lower grades of bauxite to be sulphated in an economical manner.

Other and further objects will be obvious upon an understanding of the illustrative embodiments about to be described, or will be indicated in the appended claims, and various advantages not referred to herein will occur to one skilled in the art upon employment of the invention in practice.

In accordance with the invention, I have discovered that these objects, generally, can be accomplished by flowing sulphuric acid into a sulphator while adding an aqueous slurry of aluminum ore or dry ground aluminum ore. The flow of acid and ore are regulated so that an excess of acid is maintained, or in other words, the amount of ore added is only a portion of the amount of ore which the amount of acid added is capable of sulphating. The overflow of this sulphator is then received by a second sulphator where ore is added at a rate to provide an amount equivalent to the remainder of the amount of ore which the acid is capable of sulphating. The overflow of the second sulphator then passes into a third sulphator where the reaction is completed and short circuited materials are reacted. The liquor may then be diluted and clarified and the clear solution may be evaporated in the usual manner.

I have also discovered that good yields can be obtained by further increasing the number of sulphators and the corresponding number of stages at which the ore is fed. For example, portions of the ore may be fed in three or four stages, the sum of these portions being the amount of ore which the amount of acid added is capable of sulphating.

Figure 2:
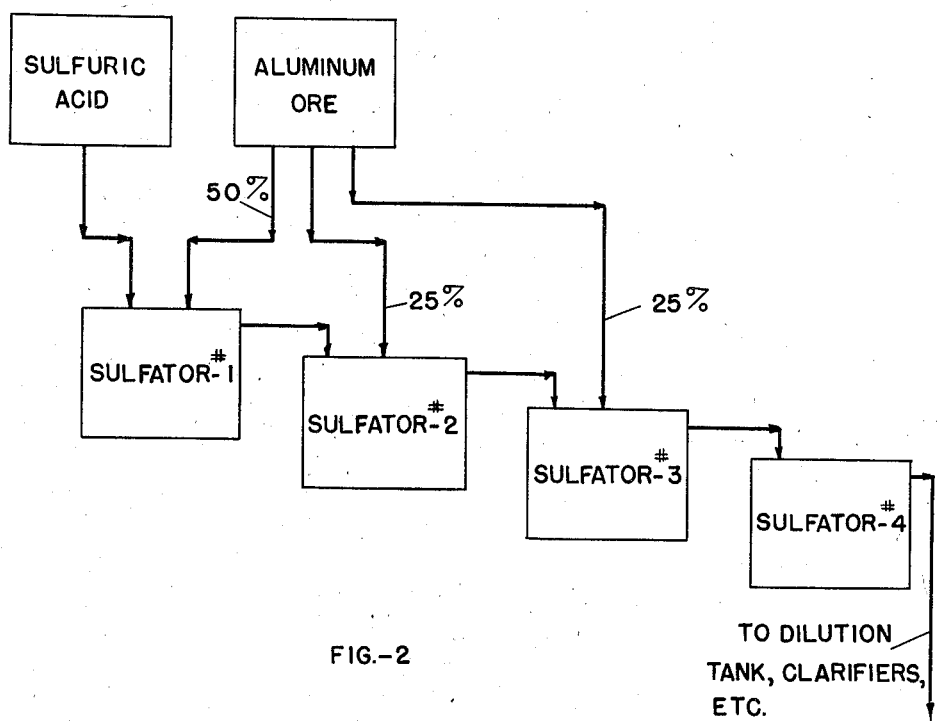

A preferred embodiment of the invention has been chosen for purposes of illustration and description and is shown in the accompanying drawings, forming a part of the specification, wherein Figure 1 is a flow sheet illustrating the improved process; and, Figure 2 is a flow sheet illustrating a modification of the process illustrated by Figure 1.

In practicing my process I prefer to use 60° Bé. sulphuric acid, but stronger acid may be used, for example 66° Bé. sulphuric acid or 98% sulphuric acid (commercial grade), with additional water added to maintain a desired concentration in the sulphators. The alumina ore I use may be bauxite containing about 57% alumina, although bauxite ores of lower alumina content are also suitable. Calcined clay, if desired, may be used in place of bauxite. The ore is ground either wet or dry and water or weak alum solution from the sludge washing system is added, if necessary, to maintain a concentration of about 52° Bé. to about 55° Bé.

Referring more particularly to Figure 1 of the drawings there is shown a flow sheet of the present process, illustrating diagrammatically, apparatus for carrying out the process. Sulphuric acid at 60° Bé. and bauxite slurry or dry ground ore are continuously added to sulphator No. 1 at predetermined rates so that over a unit of time only between about ½ and about ¾ of an amount of bauxite is added which the amount of acid added during that unit of time is capable of sulphating. For example, if about 22 parts by weight of acid are capable of sulphating about 12 parts by weight of ore, the acid may be added at a rate of about 22 parts per hour while the ore is added at a rate of between about 6 and about 9 parts per hour.

By adding the acid and ore in this manner an excess of acid is present in sulphator No. 1. This provides a more highly concentrated acid reaction mixture than in the case where all the ore which the acid is capable of sulphating, is added at once. The concentration of the mixture may be between about 50° and 55° Bé., but preferably is about 52° Bé. At these increased acid concentrations, the reaction mixture will boil only at higher temperature, for example, between about 110° and 125° C., thereby enabling the sulphating reaction to be carried out at higher temperatures than heretofore. By sulphating at such higher temperatures in an acid medium, the reaction is more rapid, goes further towards completion, and better yields are attained.

Sulphator No. 1 is effluent, and the contents thereof are conducted into sulphator No. 2 where bauxite ore is added at a rate to supply over a unit of time the amount of ore which the excess acid present during that unit of time is capable of sulphating. For example, where about 22 parts by weight of acid and between about 6 and about 9 parts by weight of ore were added per hour to sulphator No. 1, between about 6 and about 3 parts by weight of ore are added per hour to sulphator No. 2. The addition of ore slightly lowers the concentration of the reaction mixture to between about 50° and 52° Bé., reducing the acidity, whereby the mixture can be maintained at a temperature of about 105° or 106° C. and does not boil until 107° C. or more.

Sulphator No. 2 also is effluent and the contents thereof are conducted into sulphator No. 3 where any unreacted or short circuited materials are taken care of. The function of this sulphator is to complete the reaction of acid and ore, and preferably the reaction is carried out at substantially the same temperature and concentration as in sulphator No. 2.

The temperature of the reaction mixture in the sulphators may be controlled by equipping each sulphator with suitable coils for circulating either heating or cooling medium. Since the reaction between bauxite ore and sulphuric acid is exothermic, additional heat in sulphators No. 1 and No. 2 usually is not necessary, particularly during the summer months. Some heat is always added to sulphator No. 3 as the radiation losses usually are greater than the heat generated by the slight reaction taking place. In the winter months, greater radiation losses necessitate slight additional heat in all sulphators.

In very hot weather, particularly if the alum production rate has been increased, sulphator No. 1 may boil. In this case, it may be artificially cooled by circulating a cooling medium through the coils or the acidity of the mixture in sulphator No. 1 may be increased by decreasing the feed of ore to it. This reduces the reaction heat in sulphator No. 1 and also raises its boiling point. Sulphator No. 1 effluent is now more acid and more ore will be required at sulphator No. 2 to overcome this additional acidity. In effect, this is transferring an additional portion of the heat of reaction of sulphator No. 1 to sulphator No. 2.

After the ore and acid have been reacted in the series of sulphators, the overflow of sulphator No. 3, which is mostly alum solution, is conducted to a dilution tank where the concentration of the solution is reduced to about 32° Bé. This diluted solution then flows to the first of a series of clarifiers which separates the clear alum solution from the sludge.

The clear solution is then evaporated and flowed on a casting floor in the usual manner, or the clear solution may first be placed in a heated storage tank and then conducted through a service tank to the evaporator.

The sludge from clarifier No. 1 is conducted to a second clarifier where weak alum from a third clarifier is introduced. Here, again, the sludge separates from the clear solution. The clear solution of clarifier No. 2 is conducted to a weak liquor tank which supplies the necessary liquid for diluting the solution in the diluting tank.

The sludge of clarifier No. 2 is conducted to a third clarifier where wash water is introduced. The clear solution of this clarifier is returned to clarifier No. 2 to wash the sludge therein and the sludge in clarifier No. 3 is discharged from the system as waste.

The amount of wash water added to the system preferably is regulated to produce the necessary volume of weak alum liquor for use at the dilution tank and the grinding tank. The sludge is pumped as slowly as possible and still not overflow muddy liquor. The Beaumé of the first clarifier preferably is predetermined and is maintained at about 31°. Due to better washing and more complete recovery of the alum in the sludge, the Beaumes of the second and third clarifiers will be lower than heretofore. For example, in practice, the Beaumes of the second and third clarifiers have been found to be 6° and .3°, respectively.

*Example I*

About 1800 parts by weight of sulphuric acid, 60° Bé., and about 700 parts by weight of bauxite (57% alumina) in an aqueous slurry comprising 45% bauxite and 55% water slurry (corresponding to about 70% of the ore being sulfated in the system) are added per hour to sulphator No. 1, while maintaining the temperature of the reaction mixture at about 111 to 113° C. and the concentration at about 50 to 55° Bé., preferably greater than 51° Bé. The contents of sulphator No. 1 are received by sulphator No. 2 where about 300 parts by weight of the slurry (corresponding to about 30% or the remainder of the ore being sulphated in the system) are added per hour while maintaining the temperature of the reaction mixture at about 106° C. and the concentration at about 50 to 52° Bé., preferably about 51° Bé. The contents of sulphator No. 2 are received by sulphator No. 3 where sulphation of unreacted materials, usually amounting to about 3%, is completed at a temperature of about 106° C. and a concentration of about 51° Bé.

In plant practice, the rate of the overflow of the sulphators is controlled so that the average retention time of the materials in the sulphators, on plant scale, is as follows:

Sulphator No. 1—about 23 hours
Sulphator No. 2—about 7 hours
Sulphator No. 3—about 4½ hours After the sulphation steps the alum solution is diluted, clarified and evaporated by suitable means, for example, as illustrated and described herein. The foregoing amounts of ore and acid treated in the aforesaid manner, provided about 2900 parts by weight of alum per hour.

The foregoing described process was carried out over six periods and the following results were attained:

| Period | $Al_2O_3$ sulphated | Loss of sulphated $Al_2O_3$ in sludge | $Al_2O_3$ recovered |
|---|---|---|---|
|  | Percent | | Percent |
| 1 | 90.5 | .87 | 89.7 |
| 2 | 91.5 | .83 | 90.7 |
| 3 | 92.1 | .70 | 91.5 |
| 4 | 90.8 | .72 | 90.1 |
| 5 | 90.6 | .70 | 90.0 |
| 6 | 91.0 | .50 | 90.5 |

These results revealed that on an average at least 9% more alumina was sulfated, at least 12% more alumina was recovered and that sludge losses were reduced more than 70% as compared with the best prior known commercial processes of sulphating alumina. The volume of the sludge also was greatly reduced, enabling the clarifiers to work more efficiently, which is believed to account for the low sludge losses.

In order to determine the effect of varying the proportions of ore added to the first and second sulphators on the boiling point of the mixture, the percentage of alumina dissolved or sulphated, and the increase in yield, the following experiments were made:

| | Boiling point | $Al_2O_3$ sulphated | Increase in yield |
|---|---|---|---|
| | °C. | Percent | Percent |
| 1 All ore and acid, digested together 7 hours | 107 | 84.5 | |
| 2 ¾ of ore digested 3 hrs., remainder of ore then added, and all ore digested an additional 4 hours | 111 | 88.1 | 4.21 |
| 3 ⅔ of ore digested 3 hrs., remainder of ore then added, and all ore digested an additional 4 hours | 115 | 90.1 | 6.6 |
| 4 ½ of ore digested 3 hrs., remainder of ore then added, and all ore digested an additional 4 hours | 119 | 91.1 | 7.9 |

In making these tests the total reaction time of 7 hours was considered equivalent to the retention time of the materials in the sulphators on plant scale. The excess of acid during the first digestion ranged between about 33⅓% and about 100%, based on the amount of ore present. These tests illustrate that at higher acid concentrations in the first sulphator, that is, when less ore is added in proportion to the acid present, the boiling point of the mixture will be higher permitting more complete sulphation, whereby greater yields are attained.

To further illustrate the effect of acid concentration on boiling temperature and resulting yield, 66° Bé. sulphuric acid was used. About ½ of the ore to be sulphated was added and digested for 3 hours. The boiling point of this mixture was about 124° C. The other ½ of the ore was then added and the mixture was digested for 4 hours more. About 91.8% of the alumina was sulphated, presenting an increase in yield of 8.7% over the best prior known methods of sulphating alumina ores.

These tests substantiate the theory that about 85% of the alumina in bauxite ore is readily sulphated. The remaining 15% alumina in order to be sulphated, requires a higher temperature and a stronger acid. In the present process the excess of acid in the first sulphator makes possible a higher temperature because of its higher boiling point. Under these conditions a large percentage of the hard-to-dissolve alumina goes into solution. The second portion of bauxite completes the reaction to basicity by giving up only that alumina which is easy to dissolve.

*Example II*

Referring more particularly to Figure 2, a flow sheet is illustrated wherein the ore is added to the acid in three stages, for example, 50% of the ore being sulphated in the system may be added to sulphator No. 1. The contents are then conducted to sulphator No. 2 where, for example, 25% of the ore, or ½ of the remainder may be added. The contents of sulphator No. 2 then pass to sulphator No. 3 where the other 25% or the remainder of the ore is added. The contents of sulphator No. 3 may be then conducted to sulphator No. 4 where sulphation of short circuited materials is completed.

In practicing this modified process the 100% excess acid in the first sulphator dissolves a large percentage of the hard-to-dissolve alumina, the excess acid in the second sulphator dissolves a large percentage of the hard-to-dissolve alumina of the ore add at this stage, and the portion of the ore added to the third sulphator completes the reaction to basicity giving up only the alumina which is easy to dissolve. In this manner between about 93% and about 95% of the alumina may be sulphated.

If desired, the ore may be fed even in a greater number of stages, for example, four. To accomplish this, five sulphators are provided, the first receiving for example 50% of the ore, the second having 25% of the ore added, the third having 12.5% of the ore added, the fourth having the remaining 12.5% of the ore added, and the fifth taking care of short circuited materials to complete sulphation thereof. By increasing the number of sulphators and adding still less ore to the first ones, still higher temperatures may be maintained in the ones to which the ore is first added, thereby giving still better yields.

From the foregoing description, it will be seen that the present invention provides an improved process of sulphating bauxite or other alumina containing ore to produce alum. An increase in yield and saving is effected by more completely sulphating the ore due to the higher temperature and excess acid medium in the first sulphator. An additional increase in yield and saving is effected by the greater washing efficiency in recovering alum from waste sludge. This is brought about by very much faster and more compact settling of sludge resulting from the more efficient sulphating of the ore. There is an increase of production capacity of approximately 40% because the sulphating capacity is increased by the transfer of a large portion of the heat of reaction from the first sulphator to the second sulphator. The clarifying or sedimentation system can easily handle this increase in production because of the faster and more compact settling of a smaller amount of sludge. Actually in plant operation the initial settling rates are usually two to three times as fast as under the best prior known system of sulphation.

The process furthermore makes it possible to use lower grades of bauxite than could be used by regular methods of sulphation. The higher temperature and sustained strong acid condition in the first sulphator digests enough clay-like material in "border-line" bauxite to make it economically feasible. This is especially feasible if high grade bauxite is used at the second sulphator.

While the present process has been described in connection with sulphating alumina ores to produce alum, it will be understood that the process is also applicable wherever it is desired to form salts of a given acid by treating an ore or a salt of a different acid with the given acid and where in such treatment higher yields and less sludge result by the utilization of higher reaction temperatures and more complete digestion.

It will be understood that the details and examples hereinbefore set forth are illustrative only and that the invention as broadly described and claimed is in no way limited thereby.

What I claim and desire to protect by Letters Patent is:

1. In a process of making aluminum sulphate by the treatment of an aluminum ore with sulphuric acid, the steps which consist in continuously adding at a predetermined rate substantially all of the sulphuric acid required for the treatment to a first reaction zone, continuously adding aluminum ore to said first reaction zone at such a rate as to supply but a fraction of the amount of ore chemically equivalent to the sulphuric acid present in said zone, continuously conducting both the liquid and solid contents of said first reaction zone to a second reaction zone, continuously adding aluminum ore of substantially the same kind and substantially the same particle size as that added to the first reaction zone to said second reaction zone at such a rate as to supply the amount of ore required for substantial completion of the reaction, and continuously conducting both the liquid and solid contents of said second reaction zone to a third reaction zone wherein the reaction is completed.

2. In a process of making aluminum sulphate by the treatment of an aluminum ore with sulphuric acid, the steps which consist in continuously adding at a predetermined rate substantially all of the sulphuric acid required for the treatment to a first reaction zone, continuously adding aluminum ore to said first reaction zone at such a rate as to supply between about 50 and about 75 per cent of the amount of ore chemically equivalent to the sulphuric acid present in said zone, continuously conducting both the liquid and solid contents of said first reaction zone to a second reaction zone, continuously adding aluminum ore of substantially the same kind and substantially the same particle size as that added to the first reaction zone to said second reaction zone at such a rate as to supply the amount of ore required for substantial completion of the reaction, and continuously conducting both the liquid and solid contents of said second reaction zone to a third reaction zone wherein the reaction is completed.

3. In a process of making aluminum sulphate by the treatment of an aluminum ore with sulphuric acide, the steps which consist in continuously adding at a predetermined rate substantially all of the sulphuric acid required for the treatment to a first reaction zone, continuously adding aluminum ore to said first reaction zone at such a rate as to supply between about 65 and about 75 per cent of the amount of ore chemically equivalent to the sulphuric acid present in said zone, continuously conducting both the liquid and solid contents of said first reaction zone to a second reaction zone, continuously adding aluminum ore of substantially the same kind and substantially the same particle size as that added to the first reaction zone to said second reaction zone at such a rate as to supply the amount of ore required for substantial completion of the reaction, and continuously conducting both the liquid and solid contents of said second reaction zone to a third reaction zone wherein the reaction is completed.

4. In a process of making aluminum sulphate by the treatment of an aluminum ore with sulphuric acid, the steps which consist in continuously adding at a predetermined rate substantially all of the sulphuric acid required for the treatment to a first reaction zone, continuously adding aluminum ore to said first reaction zone at such a rate as to supply but a fraction of the amount of ore chemically equivalent to the sulphuric acid present in said zone while maintaining a temperature within said reaction zone between about 110° C. and about 125° C., continuously conducting both the liquid and solid contents of said first reaction zone to a second reaction zone, continuously adding aluminum ore of substantially the same kind and substantially the same particle size as that added to the first reaction zone to said second reaction zone at such a rate as to supply the amount of ore required for substantial completion of the reaction, and continuously conducting both the liquid and solid contents of said second reaction zone to a third reaction zone wherein the reaction is completed.

5. In a process of making aluminum sulphate by the treatment of an aluminum ore with sulphuric acid, the steps which consist in continuously adding at a predetermined rate substantially all of the sulphuric acid required for the treatment to a first reaction zone, continuously adding aluminum ore to said first reaction zone at such a rate as to supply between about 65 and about 75 per cent by weight of the amount of ore chemically equivalent to the sulphuric acid present in said first reaction zone while maintaining a temperature within said first reaction zone between about 111° C. and about 113° C., continuously conducting both the liquid and solid contents of said first reaction zone to a second reaction zone, continuously adding aluminum ore of substantially the same kind and substantially the same particle size as that added to the first reaction zone to said second reaction zone at such a rate as to supply the amount of ore required for substantial completion of the reaction while maintaining a temperature of about 106° C. within said second reaction zone, and conducting both the liquid and solid contents of said second reaction zone to a third reaction zone maintained at a temperature of about 106° C. and wherein the reaction is completed.

6. In a process of making aluminum sulphate by the treatment of an aluminum ore with sulphuric acid, the steps which consist in continuously adding at a predetermined rate substantially all of the sulphuric acid required for the treatment to a first reaction zone, continuously adding aluminum ore to said first reaction zone at such a rate as to supply but a fraction of the amount of ore chemically equivalent to the sulphuric acid present in said first reaction zone, continuously conducting both the liquid and solid contents of said first reaction zone to a second reaction zone, continuously adding aluminum ore of substantially the same kind and substantially the same particle size as that added to the first reaction zone to said second reaction zone at such a rate as to supply but a fraction of the amount of ore chemically equivalent to the sulphuric acid present in said second reaction zone, continuously conducting both the liquid and solid contents of said second reaction zone to a third reaction zone, continuously adding aluminum ore of substantially the same kind and substantially the same particle size as that added to the first reaction zone to said third reaction zone at such a rate as to supply the amount of ore required for substantial completion of the reaction, and continuously conducting both the liquid and solid contents of said third reaction zone to a fourth reaction zone wherein the reaction is completed.

7. In a process of making aluminum sulphate by the treatment of an aluminum ore with sulphuric acid, the steps which consist in continuously adding at a predetermined rate substantially all of the sulphuric acid required for the treatment to the first of a plurality of reaction zones, substantially the entire contents of each of which empty into the next succeeding zone, continuously adding aluminum ore of substantially the same kind and substantially the same particle size to each of said reaction zones at such a rate as to supply but a fraction of the amount of ore chemically equivalent to the sulphuric acid present in each of said reaction zones, continuously adding aluminum ore of substantially the same kind and substantially the same particle size to the penultimate reaction zone at such a rate as to supply the amount of ore required to react with substantially all of the free sulphuric acid present in said penultimate reaction zone, and continuously conducting both the liquid and solid contents of said penultimate reaction zone to a final reaction zone wherein the reaction is completed.

ROBERT L. BROWN.